W. PRICE.
Cotton-Planters.

No. 138,043.                 Patented April 22, 1873.

Witnesses:
M. H. Chandler
C. D. Drelan

Inventor:
Whitman Price
per, John R. Town
Attorney.

UNITED STATES PATENT OFFICE.

WHITMAN PRICE, OF MOUNT OLIVE, NORTH CAROLINA.

IMPROVEMENT IN COTTON-PLANTERS.

Specification forming part of Letters Patent No. 138,043, dated April 22, 1873; application filed January 31, 1873.

*To all whom it may concern:*

Be it known that I, WHITMAN PRICE, of Mount Olive, in the county of Wayne and State of North Carolina, have invented certain new and useful Improvements in Cotton-Planters; and I do hereby declare that the following is a full, clear, and exact description thereof, that will enable others skilled in the art to which it appertains to make and use the same, reference being had to the accompanying drawing and to the letters of reference marked thereon which form a part of this specification.

Figure 1:
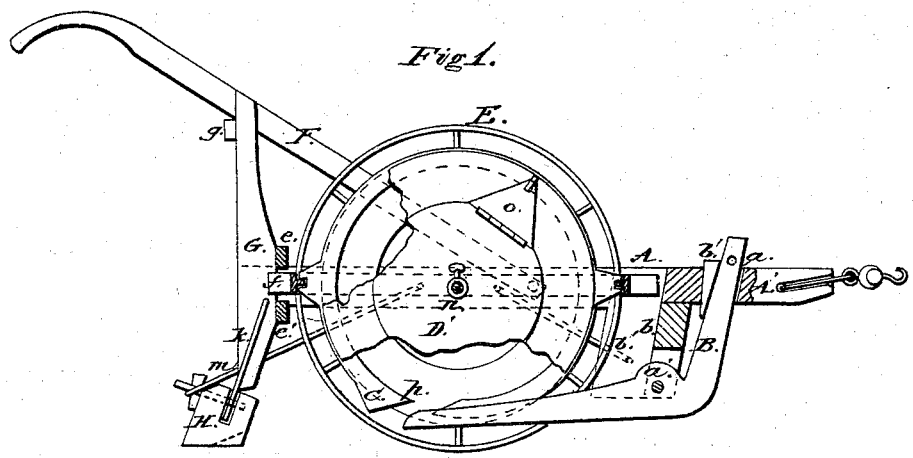
Figure 4:
Figure 2:
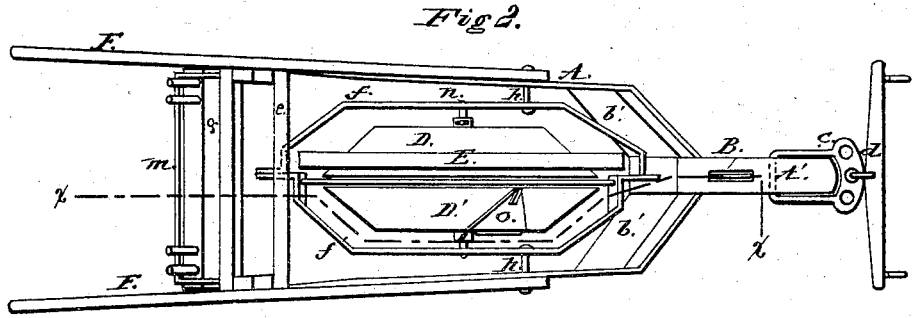
Figure 3:

Figure 1 is a vertical section of my improved cotton-seed planter taken through the line $x\,x$, Fig. 2. Fig. 2 is a plan view, showing the arrangement of the frame in which the rotating seed-box is hung, and its connection with the other parts of the machine. Fig. 3 represents the covering-block. Fig. 4 is a representation of the shield or sleeve, which is placed upon the triangular extremity of the annular plate through which the seed is emitted, whenever it is desired to reduce the size of the opening in the plate, so that less seed may be deposited in the furrow.

My invention has for its object to furnish a simple, convenient, and reliable machine for planting cotton-seed, and which shall be so constructed that it may be conveniently adjusted to deposit more or less seed in the furrow, as may be desired; and it consists in the construction, arrangement, and combination of the various parts of the machine, as hereinafter more fully described.

A is the frame of the machine, the sides of which I prefer to form of thin and wide bars of iron, attached at their forward end to a beam of wood, A'. Through this beam is a mortise, $a$, which receives one end of an L-shaped colter, B, which is pivoted to the standard $b$ at $a'$, and is rendered adjustable by a wedge, $b'$, inserted in the mortise in the piece A'; or, if desired, two wedges, one upon each side of this end of the colter, may be employed, which will enable the operator to secure it in such position as to form any depth of furrow for the reception of the seed that may be needed. Upon each side of the colter, and attached to the standard $b$, are mold-boards $b'$, which serve to throw out of the way any clods or other material which might interfere with the action of the seeder. The clevis $c$ is attached to the forward end of the piece A', and is provided with a series of holes in its front portion, into one of which the hook of the whiffletree $d$ enters. It is obvious from this construction that the machine may be made to run at either side of the line of draft by changing the hook from a hole upon one side of the center to one upon the other. Across the rear of the frame extends two girts, $e$ and $e'$, and securely fastened to them are two standards, G, connected at their upper ends by a tie, $g$, and also forming a support for the handles F, which are attached to the frame of the machine at their lower ends by the bolts $h$. The standards G also carry the covering-block H, which is hung to it by the pivoted rods $k$, and retained in a proper position for performing its function by means of wedges inserted between its rear side and a retaining bar, $m$. An inner frame, composed of the two pieces $f$ and $f'$, is secured within the frame A by being pivoted upon the bolts $h$ near its forward end, and, its rear passing between the girts $e$ and $e'$, it will be seen that this attachment allows a limited vibration in a vertical direction of the inner frame upon the bolts $h$. Near the center of the frame $f$ and $f'$ a shaft, $n$, is placed, crossing it at a right angle and carrying the two adjustable concave halves of the rotating hopper D D'. The part D of this hopper is provided with a series of spokes extending from its periphery, and which support the carrying-wheel E; and the part D' has a hinged cover, $o$, which secures the opening through which the seed is introduced into the hopper. Hanging loosely between the parts D and D' of the hopper, upon suitable supports at each end of the inner frame, is an annular plate, C, forming nearly a complete circle, but having a peculiarly-formed opening at its lower side, through which the seed is emitted. This opening may be diminished in size by placing upon the point of the ring at $p$ a sleeve, K, of such length as may be necessary to reduce the opening to the required dimensions.

It will be seen that the rotation of the hopper will continually crowd the seed toward the opening in the plate C, and that the amount of seed deposited in the furrow will depend upon the size of that opening.

I am aware of the patent to W. J. Arrington, bearing date July 6, 1869, and therefore do not claim anything contained therein; but I do claim as my invention—

The annular plate C, provided with the sleeve K, in combination with the vibrating supporting-frame $f$ and $f'$ and rotating hopper D and D', substantially as and for the purpose specified.

In testimony that I claim the foregoing, I have hereunto set my hand this 14th day of December, 1872.

W. PRICE.

Witnesses:
M. K. CHANDLER,
EDWD. McB. TIMONEY.